US012711652B2

(12) United States Patent
Kimata

(10) Patent No.: US 12,711,652 B2
(45) Date of Patent: Aug. 18, 2026

(54) IMAGE PROCESSING APPARATUS, IMAGE PICKUP APPARATUS, CONTROL METHOD FOR IMAGE PROCESSING APPARATUS, AND STORAGE MEDIUM CAPABLE OF NOTIFYING USER OF BLUR INFORMATION, OR OF DISPLAYING INDICATOR

(71) Applicant: CANON KABUSHIKI KAISHA, Tokyo (JP)

(72) Inventor: Kazumasa Kimata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 343 days.

(21) Appl. No.: 18/536,582

(22) Filed: Dec. 12, 2023

(65) Prior Publication Data

US 2024/0202960 A1 Jun. 20, 2024

(30) Foreign Application Priority Data

Dec. 15, 2022 (JP) ................................ 2022-200566

(51) Int. Cl.
*G06T 7/70* (2017.01)
*G06T 7/62* (2017.01)
(Continued)

(52) U.S. Cl.
CPC .................. *G06T 7/70* (2017.01); *G06T 7/62* (2017.01); *G06V 10/25* (2022.01); *G09G 5/377* (2013.01); *G06V 2201/07* (2022.01)

(58) Field of Classification Search
CPC ....... G06T 2200/24; G06T 2207/10016; G06T 7/62; G06T 7/70; G06V 10/25;
(Continued)

(56) References Cited

U.S. PATENT DOCUMENTS 6,677,990 B1 * 1/2004 Kawahara .............. H04N 23/63 348/E7.087
2003/0095797 A1 * 5/2003 Nakata .................. G03B 17/00 396/54

(Continued)

FOREIGN PATENT DOCUMENTS

DE 102016105879 A1 * 10/2016 ........... H04N 23/667
JP 2013085178 A * 5/2013

(Continued)

*Primary Examiner* — John Villecco
*Assistant Examiner* — Michael M Sofroniou
(74) *Attorney, Agent, or Firm* — Cowan, Liebowitz & Latman, P.C.

(57) ABSTRACT

An image processing apparatus capable of notifying a user of the presence of a possibility that blur information of a desired subject has not been acquired or of displaying an indicator at a position with good visibility is provided. The image processing apparatus includes one or more processors and a memory storing instructions which, when executed by one or more processors, cause the apparatus to function as a detection unit that detects a subject from an LV image, and a display control unit that displays an indicator indicating blur information on the subject detected by the detection unit so as to be superimposed on the LV image. The display control unit controls a display of the indicator in the LV image based on first information related to a detection region in which the detection unit detects the subject and/or second information related to the subject detected by the detection unit.

16 Claims, 12 Drawing Sheets

(51) Int. Cl.
*G06V 10/25* (2022.01)
*G09G 5/377* (2006.01)

(58) Field of Classification Search
CPC .... G06V 2201/07; G09G 5/377; H04N 23/53; H04N 23/61; H04N 23/63; H04N 23/68
See application file for complete search history.

(56) References Cited

U.S. PATENT DOCUMENTS

| | | | | |
|---|---|---|---|---|
| 2009/0262230 | A1* | 10/2009 | Sugiura | H04N 5/145 348/E5.022 |
| 2013/0076958 | A1* | 3/2013 | Shirakawa | H04N 23/633 348/E5.022 |
| 2014/0104313 | A1* | 4/2014 | Matsumoto | G06V 40/103 345/632 |
| 2015/0156419 | A1* | 6/2015 | Aggarwal | G06T 5/73 348/208.1 |
| 2018/0288330 | A1* | 10/2018 | Miyazawa | H04N 23/6811 |
| 2019/0130580 | A1* | 5/2019 | Chen | G06V 10/82 |
| 2020/0145583 | A1* | 5/2020 | Shanmugam | G06V 10/764 |
| 2020/0213497 | A1* | 7/2020 | Kubo | H04N 23/689 |
| 2020/0213528 | A1* | 7/2020 | Yamaguchi | G06T 7/20 |
| 2020/0366846 | A1* | 11/2020 | Saitsu | H04N 23/667 |

FOREIGN PATENT DOCUMENTS

| | | |
|---|---|---|
| JP | 2022-043930 A | 3/2022 |
| JP | 2022-124464 A | 8/2022 |

* cited by examiner

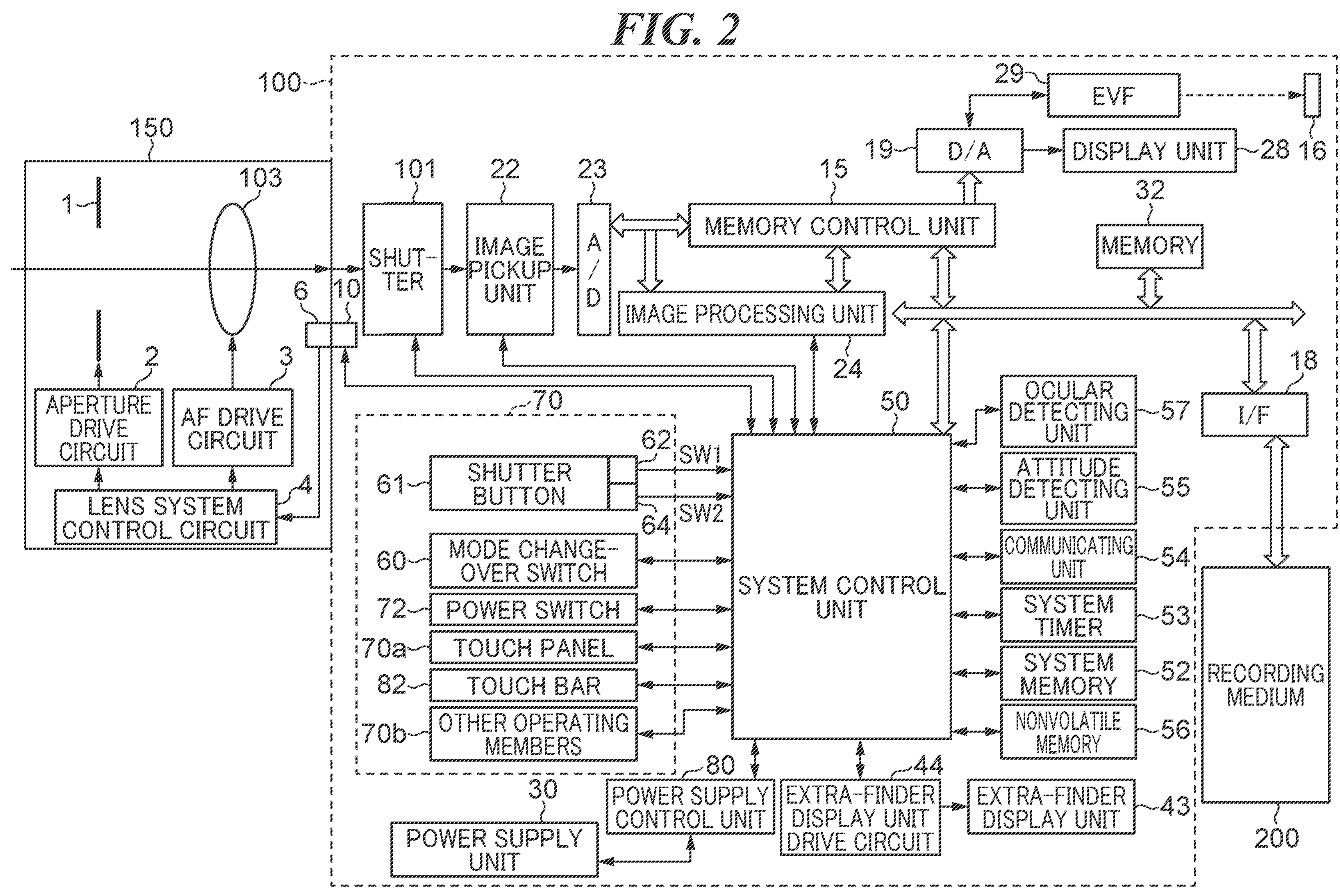
FIG. 2
100
150
1
103
2
APERTURE DRIVE CIRCUIT
3
AF DRIVE CIRCUIT
4
LENS SYSTEM CONTROL CIRCUIT
6
10
101
SHUT-TER
22
IMAGE PICKUP UNIT
23
A/D
15
MEMORY CONTROL UNIT
24
IMAGE PROCESSING UNIT
19
D/A
29
EVF
DISPLAY UNIT
28
16
32
MEMORY
18
I/F
RECORDING MEDIUM
200
50
SYSTEM CONTROL UNIT
OCULAR DETECTING UNIT
57
ATTITUDE DETECTING UNIT
55
COMMUNICATING UNIT
54
SYSTEM TIMER
53
SYSTEM MEMORY
52
NONVOLATILE MEMORY
56
70
61
SHUTTER BUTTON
62
SW1
64
SW2
60
MODE CHANGE-OVER SWITCH
72
POWER SWITCH
70a
TOUCH PANEL
82
TOUCH BAR
70b
OTHER OPERATING MEMBERS
30
POWER SUPPLY UNIT
80
POWER SUPPLY CONTROL UNIT
44
EXTRA-FINDER DISPLAY UNIT DRIVE CIRCUIT
EXTRA-FINDER DISPLAY UNIT
43

Figure 7:
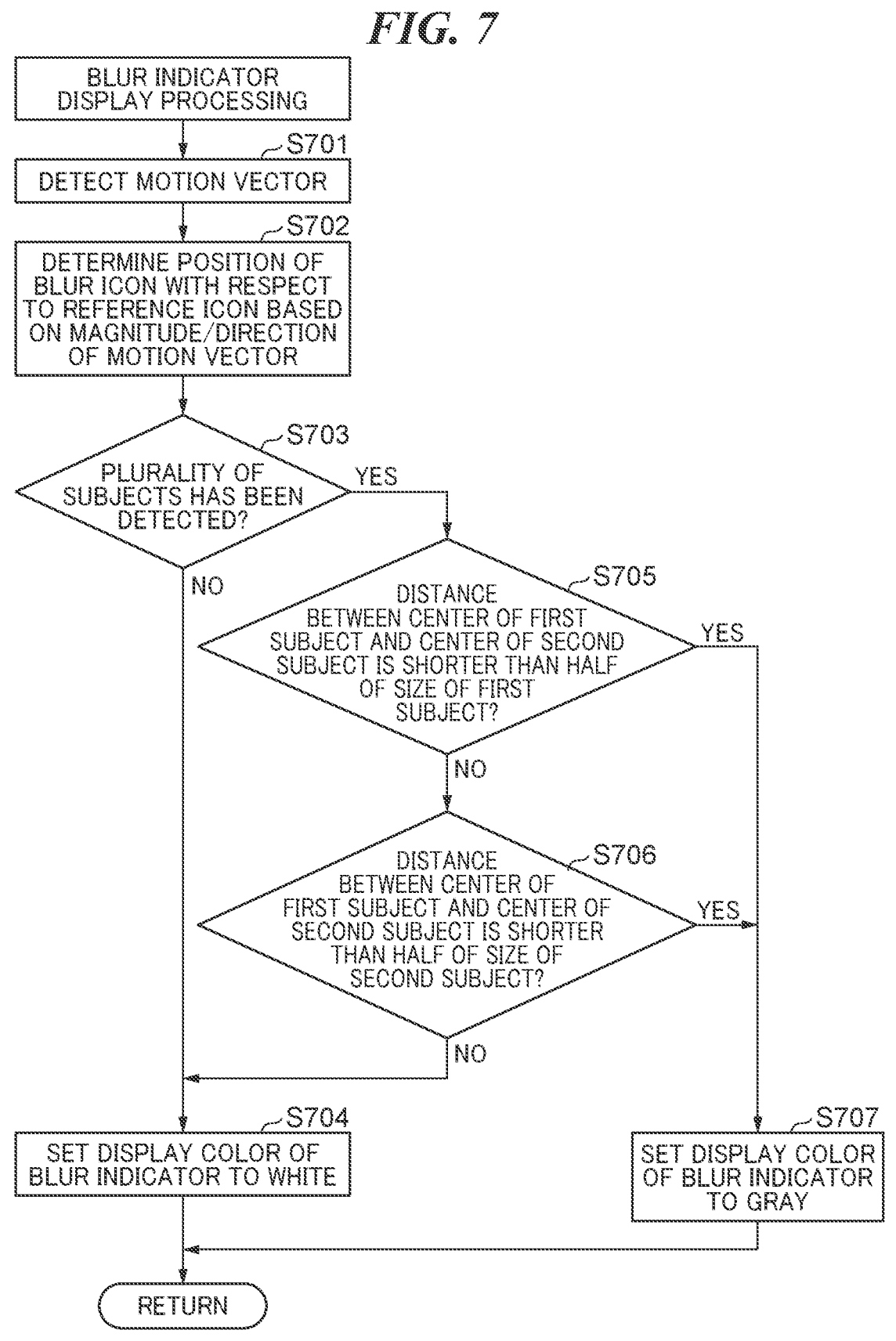

BLUR INDICATOR DISPLAY PROCESSING

S701 DETECT MOTION VECTOR

S702 DETERMINE POSITION OF BLUR ICON WITH RESPECT TO REFERENCE ICON BASED ON MAGNITUDE/DIRECTION OF MOTION VECTOR

S703 PLURALITY OF SUBJECTS HAS BEEN DETECTED?
YES
NO

S705 DISTANCE BETWEEN CENTER OF FIRST SUBJECT AND CENTER OF SECOND SUBJECT IS SHORTER THAN HALF OF SIZE OF FIRST SUBJECT?
YES
NO

S706 DISTANCE BETWEEN CENTER OF FIRST SUBJECT AND CENTER OF SECOND SUBJECT IS SHORTER THAN HALF OF SIZE OF SECOND SUBJECT?
YES
NO

S704 SET DISPLAY COLOR OF BLUR INDICATOR TO WHITE

S707 SET DISPLAY COLOR OF BLUR INDICATOR TO GRAY

RETURN

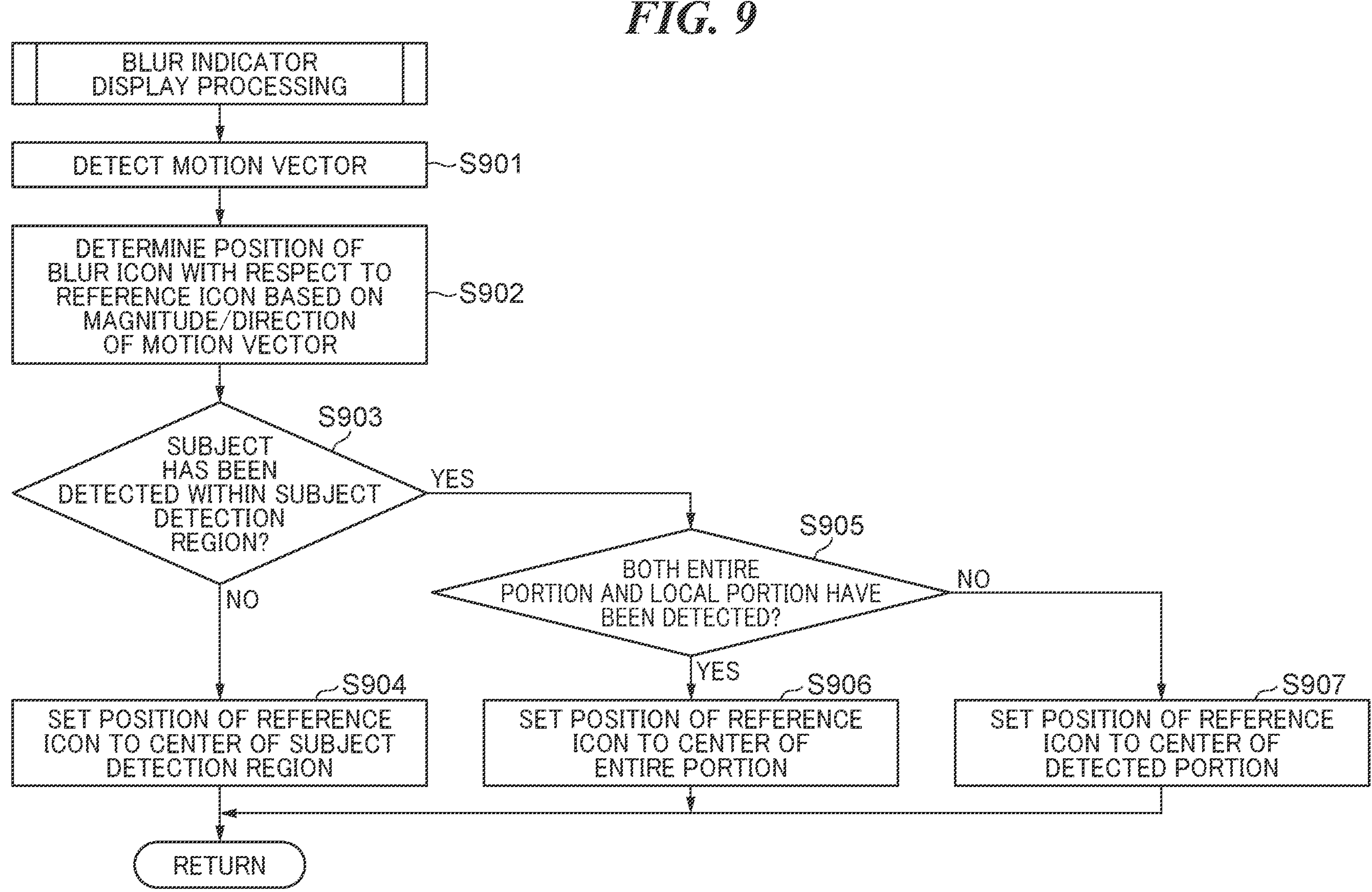
FIG. 9
BLUR INDICATOR DISPLAY PROCESSING
DETECT MOTION VECTOR
S901
DETERMINE POSITION OF BLUR ICON WITH RESPECT TO REFERENCE ICON BASED ON MAGNITUDE/DIRECTION OF MOTION VECTOR
S902
SUBJECT HAS BEEN DETECTED WITHIN SUBJECT DETECTION REGION?
S903
YES
NO
BOTH ENTIRE PORTION AND LOCAL PORTION HAVE BEEN DETECTED?
S905
NO
YES
SET POSITION OF REFERENCE ICON TO CENTER OF SUBJECT DETECTION REGION
S904
SET POSITION OF REFERENCE ICON TO CENTER OF ENTIRE PORTION
S906
SET POSITION OF REFERENCE ICON TO CENTER OF DETECTED PORTION
S907
RETURN

IMAGE PROCESSING APPARATUS, IMAGE PICKUP APPARATUS, CONTROL METHOD FOR IMAGE PROCESSING APPARATUS, AND STORAGE MEDIUM CAPABLE OF NOTIFYING USER OF BLUR INFORMATION, OR OF DISPLAYING INDICATOR

BACKGROUND

Field

The aspect of the embodiments relates to an image processing apparatus, an image pickup apparatus, a control method for the image processing apparatus, and a storage medium, and particularly relates to a technique for assisting panning.

Description of the Related Art

In order to capture an image of a moving subject without a subject blur, it is necessary to set an appropriate shutter speed to capture the image, or to capture the image by causing an image pickup apparatus to follow the moving subject. In particular, in a method to be described below (the panning), since an advanced operation of the image pickup apparatus is required at a time of shooting, various kinds of assisting functions and various kinds of techniques have been proposed. For example, Japanese Laid-Open Patent Publication (kokai) No. 2022-43930 discloses a technique of displaying a region for detecting a blur amount and an indicator indicating blur information of a subject detected from an image. In addition, Japanese Laid-Open Patent Publication (kokai) No. 2022-124464 discloses a technique of estimating a motion blur of a subject from an image and displaying blur information at a position of the subject.

However, in the display technique disclosed in Japanese Laid-Open Patent Publication (kokai) No. 2022-43930, there is a problem that it is difficult for a user to know whether or not the blur information of a desired subject has been acquired. Moreover, in the display technique disclosed in Japanese Laid-Open Patent Publication (kokai) No. 2022-124464, there is a problem that it is difficult to visually recognize the indicator, for example, in the case that the position of the subject changes at a high speed.

SUMMARY

According to an aspect of the embodiments, an image processing apparatus, an image pickup apparatus, a control method for the image processing apparatus, and a storage medium, which are capable of notifying a user of the presence of a possibility that blur information of a desired subject has not been acquired or of displaying an indicator at a position with good visibility, are provided.

Accordingly, the present disclosure provides an image processing apparatus comprising one or more processors, and a memory storing instructions which, when executed by the one or more processors, cause the image processing apparatus to function as a detection unit that detects a subject from a live view image, and a display control unit that displays an indicator indicating blur information on the subject detected by the detection unit so as to be superimposed on the live view image. The display control unit controls a display of the indicator in the live view image based on first information related to a detection region in which the detection unit detects the subject and/or second information related to the subject detected by the detection unit.

Accordingly, the present disclosure provides an image pickup apparatus comprising the image processing apparatus and an obtaining unit configured to obtain the live view image.

Further features of the present disclosure will become apparent from the following description of exemplary embodiments with reference to the attached drawings.

BRIEF DESCRIPTION OF THE DRAWINGS

FIG. 2 is a block diagram that shows an example of a configuration of the digital camera 100.

FIG. 3 is a flowchart that shows a flow of control when the digital camera 100 performs a blur assist.

FIG. 7 is a flowchart that shows a blur indicator display processing performed in the step S307 according to the second embodiment.

FIG. 9 is a flowchart that shows a blur indicator display processing performed in the step S307 according to the third embodiment.

DESCRIPTION OF THE EMBODIMENTS

Figure 1A:
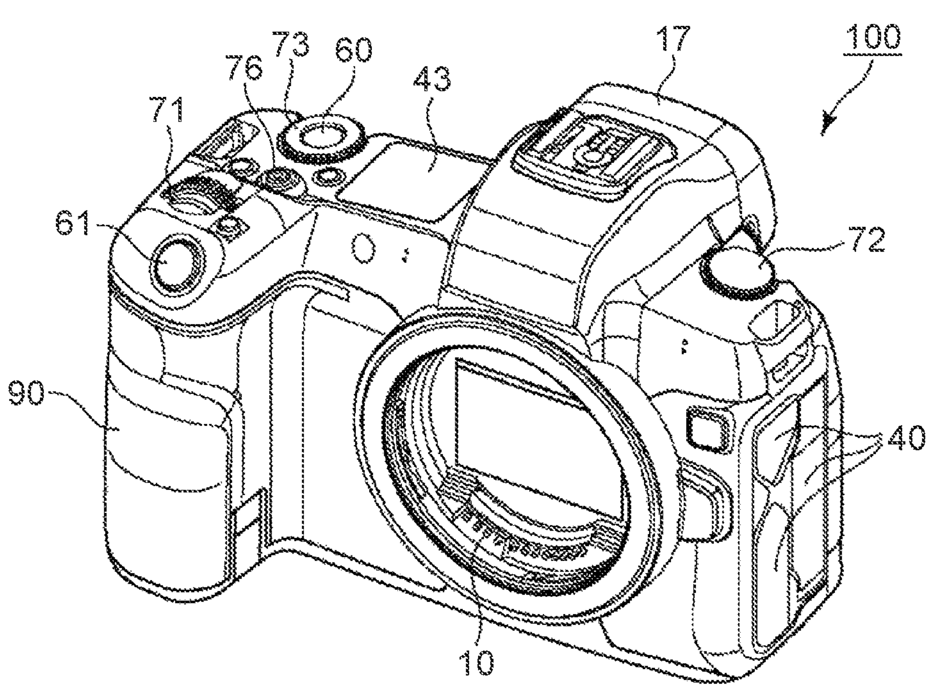
FIG. 1A is a front perspective view of a digital camera 100.

The present disclosure will now be described in detail below with reference to the accompanying drawings showing embodiments thereof.

Preferable exemplary embodiments of the disclosure will be described in detail below with reference to the accompanying drawings. However, configurations described in the following embodiments are merely examples, and the scope of the present disclosure is not limited by the configurations described in the following embodiments. For example, each unit (part) constituting the present disclosure can be replaced with a unit (part) having an arbitrary configuration capable of exhibiting a similar function. In addition, arbitrary components may be added. Any two or more configurations (features) of the embodiments may be combined. Furthermore, the same or similar components are denoted by the same reference numerals in the accompanying drawings, and redundant description is omitted.

Hereinafter, a first embodiment will be described with reference to FIGS. 1A, 1B, 2, 3, 4A, 4B, 4C, 4D, and 4E.

Figure 1B:
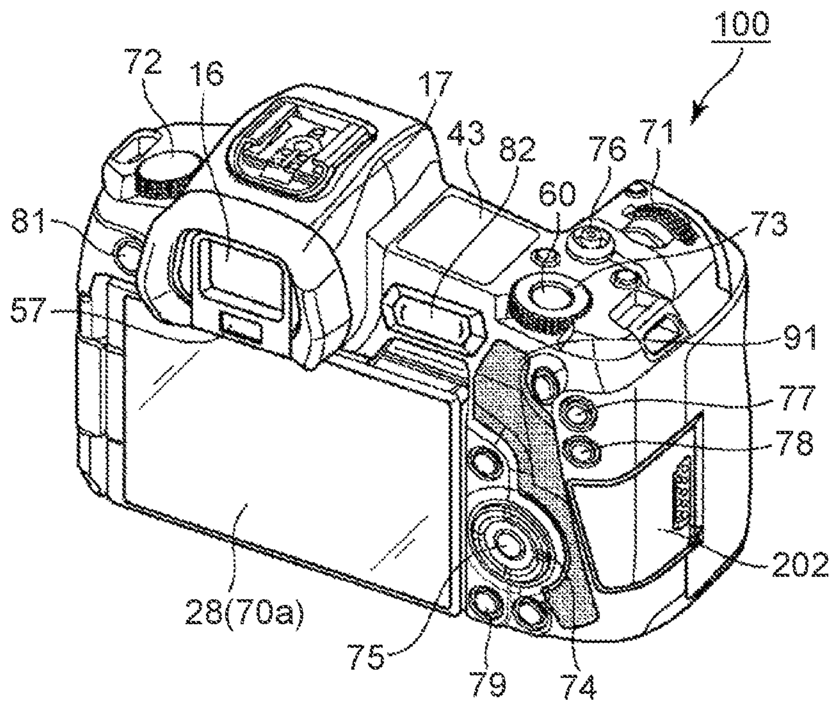
FIG. 1B is a rear perspective view of the digital camera 100.

FIGS. 1A and 1B show external views of a digital camera 100 as an example of an image pickup apparatus to which the present disclosure is applicable. FIG. 1A is a front perspective view of the digital camera 100, and FIG. 1B is a rear perspective view of the digital camera 100. A display unit 28 is a display unit provided on a rear surface of the digital camera 100, and displays images and various types of information. A touch panel 70*a* is capable of detecting touch operations with respect to a display surface (a touch operation surface) of the display unit 28. An extra-finder display unit 43 is a display unit provided on an upper surface of the digital camera 100, and displays various setting values of the digital camera 100 such as a shutter speed and an aperture. A shutter button 61 is an operating member for issuing a shooting instruction. A mode change-over switch 60 is an operating member for switching between various modes.

Terminal covers 40 are covers for protecting connectors (not shown) to which connection cables or the like for connecting the digital camera 100 to external devices are connected. A main electronic dial 71 is a rotating operating member, and the setting values such as the shutter speed and the aperture is able to be changed by turning the main electronic dial 71. A power switch 72 is an operating member for switching power of the digital camera 100 between on and off. A sub electronic dial 73 is a rotating operating member, and operations such as moving a selection frame and feeding the images is able to be performed by turning the sub electronic dial 73. A four-way key 74 is configured such that upper, lower, left, and right portions thereof are respectively depressible, and enables a processing corresponding to a depressed portion of the four-way key 74 to be performed. A SET button 75 is a push button mainly used to determine a selected item.

A moving image button 76 is used to issue instructions to start and stop moving image shooting (moving image recording). An AE lock button 77 is a push button, and an exposure state can be fixed by depressing the AE lock button 77 in a shooting standby state. An enlargement button 78 is an operation button for switching an enlargement mode on and off in a live view display (an LV display) in a shooting mode. A live view image (an LV image) can be enlarged or reduced by operating the main electronic dial 71 after switching on the enlargement mode. In a playback mode, the enlargement button 78 functions as an operation button for enlarging a playback image or increasing an enlargement rate of the playback image.

A playback button 79 is an operation button for switching between the shooting mode and the playback mode. The playback mode is selected by depressing the playback button 79 in the shooting mode, and a latest image among images recorded in a recording medium 200 (to be described below) can be displayed on the display unit 28. A menu button 81 is a push button used for performing an instruction operation to display a menu screen, and the menu screen enabling various kinds of settings to be performed is displayed on the display unit 28 when the menu button 81 is depressed. A user is able to intuitively perform the various kinds of settings by using the menu screen displayed on the display unit 28 together with the four-way key 74 and the SET button 75.

A touch bar 82 (an M-Fn bar, i.e., a multi-function bar) is a linear touch operating member (a line touch sensor) capable of accepting a touch operation. The touch bar 82 is disposed at a position where the touch operation can be performed on the touch bar 82 (where the touch bar 82 is touchable) by a thumb of a right hand gripping a grip portion 90 in a normal gripping method (a gripping method recommended by a manufacturer). The touch bar 82 is an accepting unit capable of accepting a tap operation with respect to the touch bar 82 (an operation involving touching and then releasing without moving within a prescribed period of time), leftward and rightward sliding operations (operations involving touching and moving a touch position while maintaining the touch), and the like. The touch bar 82 is an operating member that differs from the touch panel 70*a* and is not equipped with a display function.

A communication terminal 10 is a communication terminal used by the digital camera 100 to communicate with a lens unit 150 (which will be described below and is attachable and detachable). An eyepiece portion 16 is an eyepiece portion of an eyepiece type finder 17 (a look-in type finder), and the user is able to visually confirm a video image displayed on an internal EVF 29 (to be described below) via the eyepiece portion 16. An ocular detecting unit 57 is an ocular detection sensor that detects whether or not an eye of the user is contacted with the eyepiece portion 16. A lid 202 is a lid of a slot in which the recording medium 200 (to be described below) is stored.

The grip portion 90 is a holding portion configured in a shape that can be readily gripped by the right hand when the user holds the digital camera 100. The shutter button 61 and the main electronic dial 71 are disposed at positions where the shutter button 61 and the main electronic dial 71 can be operated by the index finger of the right hand in a state where the digital camera 100 is held by gripping the grip portion 90 with the little finger, the ring finger, and the middle finger of the right hand of the user. In addition, the sub electronic dial 73 and the touch bar 82 are disposed at positions where the sub electronic dial 73 and the touch bar 82 can be operated by the thumb of the right hand of the user in the same state. A thumb rest portion 91 (a thumb standby position) is a gripping member provided at a location where the thumb of the right hand gripping the grip portion 90 can be readily placed on a rear side of the digital camera 100 in a state where none of the operating members are being operated by the user. The thumb rest portion 91 is configured, for example, by a rubber member or the like in order to enhance a holding force (a gripping feeling).

FIG. 2 is a block diagram that shows an example of a configuration of the digital camera 100. The lens unit 150 is a lens unit mounted with an interchangeable photographing lens. While a lens 103 is usually configured by a plurality of lenses, the lens 103 is shown with only one lens in a simplified manner in FIG. 2. A communication terminal 6 is a communication terminal used by the lens unit 150 to communicate with the digital camera 100, and the communication terminal 10 is a communication terminal used by the digital camera 100 to communicate with the lens unit 150. The lens unit 150 communicates with a system control unit 50 via the communication terminal 6 and the communication terminal 10. In addition, the lens unit 150 controls an aperture 1 via an aperture drive circuit 2 by using a lens system control circuit 4 therein. Furthermore, the lens unit 150 performs focusing by displacing a position of the lens 103 via an AF drive circuit 3 by using the lens system control circuit 4.

A shutter 101 is a focal plane shutter capable of freely controlling an exposure time of an image pickup unit 22 under the control of the system control unit 50. The image pickup unit 22 (an obtaining unit) is an image pickup device configured by a CCD solid-state image pickup device or a CMOS solid-state image pickup device which converts an optical image into electrical signals. The image pickup unit 22 may include an imaging surface phase difference sensor that outputs information on a defocusing amount to the system control unit 50. An A/D converter 23 converts analog signals outputted from the image pickup unit 22 into digital signals.

An image processing unit 24 performs prescribed processing (a pixel interpolation processing, a resizing processing such as reduction, a color conversion processing, etc.) with respect to data from the A/D converter 23 or data from a memory control unit 15. In addition, the image processing unit 24 performs a prescribed calculating processing by using the captured image data, and the system control unit 50 performs exposure control and ranging control based on a calculation result obtained by the image processing unit 24. Accordingly, an automatic focusing (AF) processing, an automatic exposure (AE) processing, a preliminary light emission before flash (EF) processing, etc. in a through the lens (TTL) system are performed. Furthermore, the image processing unit 24 performs a prescribed calculating processing by using the captured image data, and performs an automatic white balance (AWB) processing in the TTL system based on the obtained calculation result.

Furthermore, the image processing unit 24 includes a subject detection unit (not shown), and is capable of performing a subject detection processing with respect to the data from the A/D converter 23 or the data from the memory control unit 15. A subject to be detected is assumed to be, for example, a person, an animal (a dog, a cat, a bird, a horse, or the like), or a vehicle (a motorcycle, an automobile, a train, an airplane, a ship, or the like), but is not particularly limited to the type. In addition, one or more of entire and predetermined specific local portions can be detected. For example, in the case that the subject to be detected is a person or an animal, a portion such as a head, a torso, and a pupil with respect to the entire body can be detected as the local portion, and in the case that the subject to be detected is a vehicle or the like, for example, a portion such as a windshield or a headlight of an automobile can be detected as the local portion. In the subject detection processing, for example, detection can be performed based on dictionary data corresponding to each subject generated by machine learning, but any existing method may be used.

Output data from the A/D converter 23 is written into a memory 32 via the image processing unit 24 and the memory control unit 15. Alternatively, the output data from the A/D converter 23 is written into the memory 32 via the memory control unit 15 without passing through the image processing unit 24. The memory 32 stores the image data obtained by the image pickup unit 22 and converted into digital data by the A/D converter 23 and the image data to be displayed on the display unit 28 and the EVF 29. The memory 32 has a sufficient storage capacity for storing a prescribed number of still images and a prescribed time of moving images and audio. In addition, the memory 32 also functions as a memory for image display (a video memory). A D/A converter 19 converts data for the image display stored in the memory 32 into analog signals and then supplies the analog signals to the display unit 28 and the EVF 29. In this manner, the image data for display having been written into the memory 32 is displayed by the display unit 28 and the EVF 29 via the D/A converter 19.

The display unit 28 and the EVF 29 each perform display in accordance with the analog signals from the D/A converter 19 on a display such as a liquid crystal display (an LCD), an organic electro-luminescence (EL) display, or the like. The live view display (the LV display) can be performed by converting the digital signals subjected to A/D conversion by the A/D converter 23 and accumulated in the memory 32 into the analog signals with the D/A converter 19, and sequentially transferring the analog signals to the display unit 28 or the EVF 29 and displaying the analog signals. Hereinafter, an image displayed in the live view display will be referred to as the live view image (the LV image). The various setting values of the digital camera 100 such as the shutter speed and the aperture are displayed on the extra-finder display unit 43 via an extra-finder display unit drive circuit 44.

A nonvolatile memory 56 is an electrically erasable and recordable memory and is, for example, an electrically erasable programmable read-only memory (EEPROM). Constants, programs, and the like that are necessary for operations of the system control unit 50 are recorded in the nonvolatile memory 56. Here, the programs mean programs for executing various flowcharts to be described below. The system control unit 50 is a control unit including at least one processor or one circuit, and controls the entire digital camera 100. The system control unit 50 (a display control unit) realizes respective processing to be described below by executing the programs recorded in the nonvolatile memory 56 described above. A system memory 52 is, for example, a random access memory (RAM), and the system control unit 50 loads the constants and variables that are necessary for the operations of the system control unit 50, the program read out from the nonvolatile memory 56, and the like on the system memory 52. In addition, the system control unit 50 also performs display control by controlling the memory 32, the D/A converter 19, the display unit 28, etc.

A system timer 53 is a time-measuring unit for measuring a time used in various controls and measuring a time of a built-in clock. A power supply control unit 80 includes a battery detection circuit (not shown), a DC-DC converter (not shown), a switching circuit (not shown) for switching between blocks to be energized, etc., and detects whether or not a battery has been attached, a type of the battery, a remaining battery level, and the like. In addition, the power supply control unit 80 controls the DC-DC converter based on the detection results and an instruction from the system control unit 50 and supplies respective units including the recording medium 200 with necessary voltage for a necessary period of time. A power supply unit 30 is configured by a primary battery such as an alkaline battery or a lithium battery, a secondary battery such as a NiCd battery, a NiMH battery, or a Li battery, an AC adapter, or the like.

A recording medium I/F 18 is an interface with the recording medium 200 that is a memory card, a hard disk, or the like. The recording medium 200 is a recording medium such as a memory card for recording the captured images, and is, for example, a semiconductor memory, a magnetic disk, or the like. A communicating unit 54 transmits and receives video image signals and audio signals to and from an external device connected wirelessly or by a cable. The communicating unit 54 is also capable of being connected to a wireless local area network (a wireless LAN) or the Internet. In addition, the communicating unit 54 is also capable of communicating with the external device via Bluetooth (registered trademark) or Bluetooth Low Energy. The communicating unit 54 is capable of transmitting images (including LV images) captured by the image pickup unit 22 and images recorded on the recording medium 200, and is capable of receiving image data and other various types of information from the external device.

An attitude detecting unit 55 detects an attitude of the digital camera 100 with respect to a direction of gravitational force. Based on the attitude detected by the attitude detecting unit 55, a determination can be made as to whether the image captured by the image pickup unit 22 is an image captured while holding the digital camera 100 horizontally or an image captured while holding the digital camera 100 vertically. The system control unit 50 is able to add orientation information in accordance with the attitude detected by the attitude detecting unit 55 to an image file of the image captured by the image pickup unit 22 or rotate and record the image. An acceleration sensor, a gyro sensor, or the like can be used as the attitude detecting unit 55. By using the acceleration sensor or the gyro sensor that is the attitude detecting unit 55, it is also possible to detect a movement of the digital camera 100 (panning, tilting, lifting, whether or not it is stationary, etc.).

The ocular detecting unit 57 is the ocular detection sensor, which performs an approaching detection, that is, which detects approaching (eye-contacting) and separating (eye-separation) of the eye (an object) with respect to the eyepiece portion 16 of the eyepiece type finder 17. The system control unit 50 switches display (a display state)/non-display (a non-display state) of the display unit 28 and the EVF 29 in accordance with the state detected by the ocular detecting unit 57. More specifically, in the case that at least it is in the shooting standby state and switching of a display destination is an automatic switching, during non-eye-contacting, the display destination is set to the display unit 28 and the display of the display unit 28 is turned on, and the EVF 29 is hidden. In addition, during the eye-contacting, the display destination is set to the EVF 29 and the display of the EVF 29 is turned on, and the display unit 28 is hidden.

As the ocular detecting unit 57, for example, an infrared proximity sensor can be used, and in this case, it is possible for the ocular detecting unit 57 to detect approaching of any object to the eyepiece portion 16 of the eyepiece type finder 17 incorporating the EVF 29. When the object approaches the eyepiece portion 16, infrared light projected from a light projecting portion (not shown) of the ocular detecting unit 57 is reflected by the object and is received by a light receiving portion (not shown) of the infrared proximity sensor. It is also possible to determine how close the object is from the eyepiece portion 16 (an eye-contacting distance) based on the amount of the received infrared light. In this way, the ocular detecting unit 57 performs the ocular detection that detects a proximity distance of the object to the eyepiece portion 16. In the case that an object approaching the eyepiece portion 16 from a non-eye-contacting state (a non-approaching state) within a predetermined distance has been detected, it is determined that the eye-contacting of the object has been detected. On the other hand, in the case that the object whose approach has been detected is separated by the predetermined distance or more from an eye-contacting state (an approaching state), it is determined that the eye-separation of the object has been detected.

A threshold value for detecting the eye-contacting and a threshold value for detecting the eye-separation may differ from each other by, for example, providing a hysteresis. In addition, after the eye-contacting has been detected, it is determined that it is in the eye-contacting state until the eye-separation is detected. Moreover, after the eye-separation has been detected, it is determined that it is in the non-eye-contacting state until the eye-contacting is detected. It should be noted that the infrared proximity sensor is one example of sensors that can be used as the ocular detecting unit 57, and any sensor may be used as the ocular detecting unit 57 as long as it is capable of detecting the approaching of an eye or an object that can be regarded as the eye-contacting.

An operating unit 70 is an input unit for accepting operations from the user (user operations), and is used to input various operation instructions to the system control unit 50. As shown in FIG. 2, the operating unit 70 includes the mode change-over switch 60, the shutter button 61, the power switch 72, the touch panel 70*a*, the touch bar 82, etc. In addition, as other operating members 70*b*, the operating unit 70 includes the main electronic dial 71, the sub electronic dial 73, the four-way key 74, the SET button 75, the moving image button 76, the AE lock button 77, the enlargement button 78, the playback button 79, the menu button 81, etc.

The mode change-over switch 60 switches an operating mode of the system control unit 50 to any one of a still image shooting mode, a moving image shooting mode, the playback mode, etc. As modes included in the still image shooting mode, there are an automatic shooting mode, an automatic scene determination mode, a manual mode, an aperture priority mode (an Av mode), a shutter speed priority mode (a Tv mode), a program AE mode (a P mode), and a blur assist mode. Furthermore, other available modes include various scene modes that become settings of the shooting for different shooting scenes, various custom modes, etc. By using the mode change-over switch 60, the user is able to directly switch to any one of these modes. Alternatively, after temporarily switching to a shooting mode list screen by using the mode change-over switch 60, the user may selectively switch to any one of a plurality of modes displayed on the shooting mode list screen by using another operating member. Similarly, the moving image shooting mode may include a plurality of modes.

The shutter button 61 includes a first shutter switch 62 and a second shutter switch 64. The first shutter switch 62 is turned on in the middle of an operation of the shutter button 61 by a so-called half-pressing (i.e., a shooting preparation instruction) and generates a first shutter switch signal SW1. Upon receiving the first shutter switch signal SW1, the system control unit 50 starts shooting preparation operations such as the AF processing, the AE processing, the AWB processing, the EF processing, etc. The second shutter switch 64 is turned on when the operation of the shutter button 61 is completed by a so-called full-pressing (i.e., a shooting instruction) and generates a second shutter switch signal SW2. Upon receiving the second shutter switch signal SW2, the system control unit 50 starts operations of a series of shooting processing from reading out signals from the image pickup unit 22 to writing the captured image as an image file into the recording medium 200.

Figure 3:
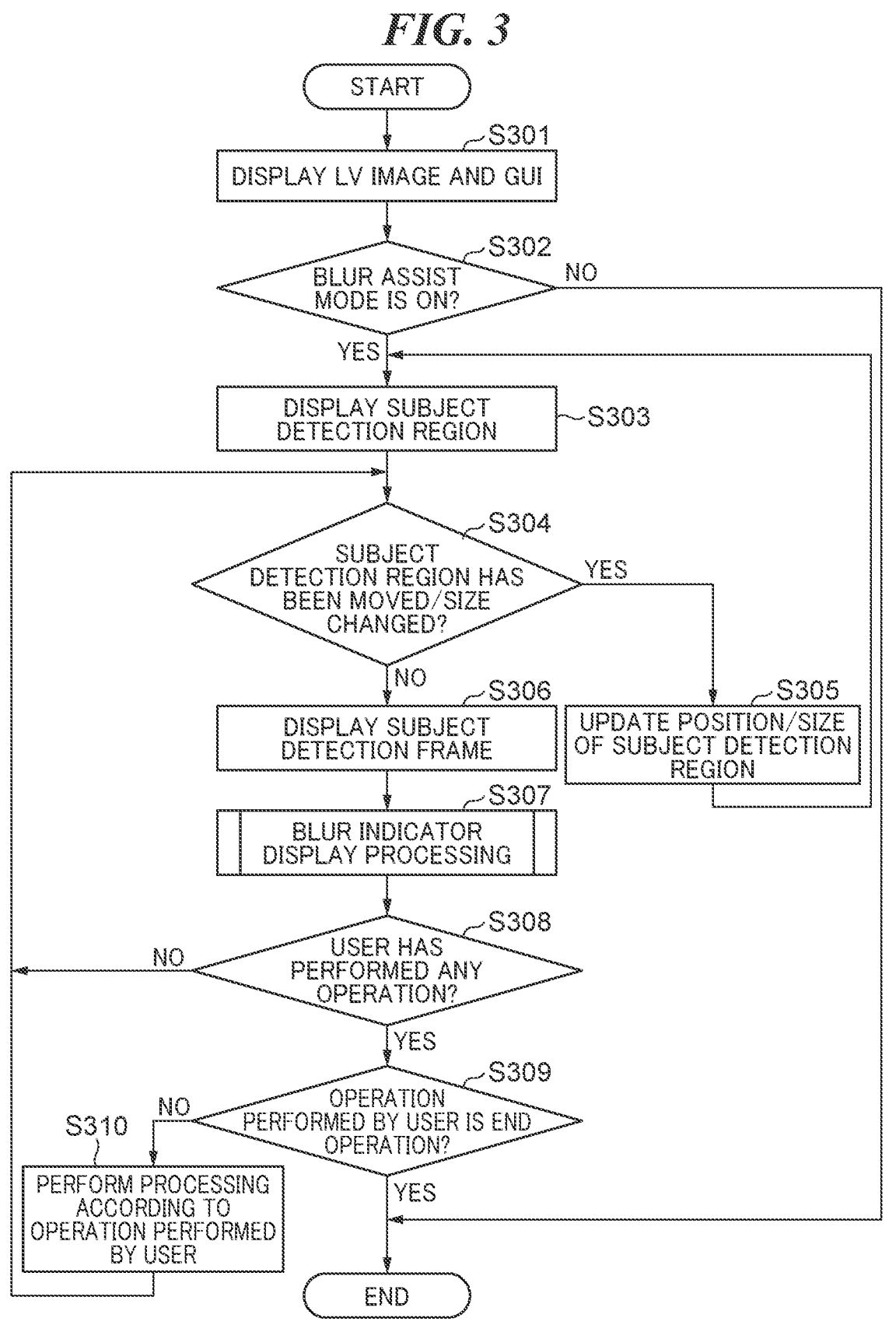

FIG. 3 is a flowchart that shows a flow of control when the digital camera 100 performs a blur assist. The control of the flowchart of FIG. 3 is started when the power switch 72 is operated by the user to turn on the power. In addition, the control of the flowchart of FIG. 3 (a control method for an image processing apparatus) is realized by loading the program recorded in the nonvolatile memory 56 on the system memory 52 and executing the program by the system control unit 50 (a computer). In a step S301, the system control unit 50 displays the LV image and a graphical user interface (a GUI) such as an icon representing a setting state of the digital camera 100 on the display unit 28.

In a step S302, the system control unit 50 determines whether or not the blur assist mode is ON (the blur assist mode is turned on). In the case that the system control unit 50 determines that the blur assist mode is not ON (the blur assist mode is not turned on), the control of the flowchart of FIG. 3 ends. On the other hand, in the case that the system control unit 50 determines that the blur assist mode is ON, the control of the flowchart of FIG. 3 (the processing) proceeds to a step S303. In the step S303, the system control unit 50 displays a subject detection region on the display unit 28. The subject detection region (a detection region) is a region indicating a range in which the system control unit 50 (a detection unit) detects a main subject in the LV image. In the case that the user sets a position and a size of the subject detection region by using the GUI, it becomes easier to detect a subject desired by the user.

In a step S304, the system control unit 50 determines whether or not an operation of moving the subject detection region or an operation of changing the size of the subject detection region has been performed by the user. In the case that the system control unit 50 determines that the operation of moving the subject detection region or the operation of changing the size of the subject detection region has been performed by the user, the processing proceeds to a step S305. On the other hand, in the case that the system control unit 50 determines that the operation of moving the subject detection region or the operation of changing the size of the subject detection region has not been performed by the user, the processing proceeds to a step S306. In the step S305, the system control unit 50 (an update unit) updates the position and the size of the subject detection region according to the user operation. After that, the processing returns to the step S303.

In the step S306, the system control unit 50 sets one subject overlapping the subject detection region among the subjects detected in the LV image as the main subject (a detection step), and displays a subject detection frame for the main subject on the display unit 28. In addition, even in the case that the subject does not overlap the subject detection region, the system control unit 50 displays the subject detection frame on the display unit 28 for one subject determined to be the main subject among the subjects detected in the LV image. It should be noted that the subject detection frame may not be displayed on the display unit 28 in the case that there is no subject in the subject detection region. In a step S307, the system control unit 50 displays a blur indicator (an indicator) (a display control step). It should be noted that the processing performed in the step S307 will be described in detail below. In a step S308, the system control unit 50 determines whether or not the user has performed any operation with respect to the digital camera 100. In the case that the system control unit 50 determines that the user has not performed any operation with respect to the digital camera 100 (no operation has been performed with respect to the digital camera 100 by the user), the processing returns to the step S304. On the other hand, in the case that the system control unit 50 determines that the user has performed any operation with respect to the digital camera 100 (some operation has been performed with respect to the digital camera 100 by the user), the processing proceeds to a step S309.

In the step S309, the system control unit 50 determines whether or not the operation performed with respect to the digital camera 100 by the user is an end operation such as an operation of turning the power off (a power OFF operation). In the case that the system control unit 50 determines that the operation performed with respect to the digital camera 100 by the user is the end operation such as the power OFF operation, the control of the flowchart of FIG. 3 ends. On the other hand, in the case that the system control unit 50 determines that the operation performed with respect to the digital camera 100 by the user is not the end operation such as the power OFF operation, the processing proceeds to a step S310. In the step S310, the system control unit 50 performs a processing according to the operation performed by the user. After that, the processing returns to the step S304.

Figure 4A:
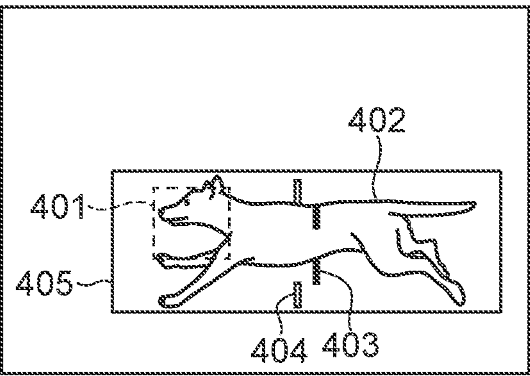
FIGS. 4A, 4B, 4C, 4D, and 4E are diagrams that show an example of a blur indicator display performed in a step S307.
Figure 4B:
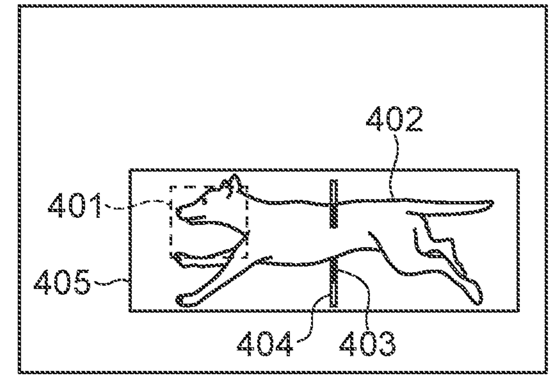
Figure 4C:
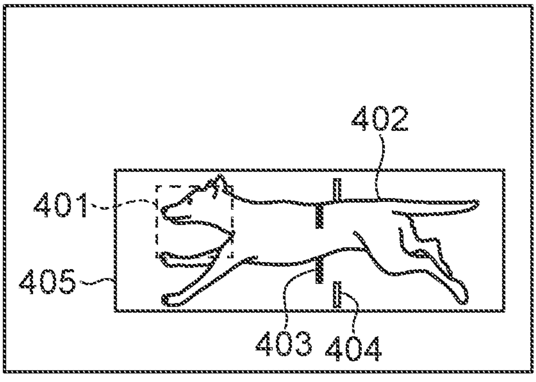

FIGS. 4A, 4B, 4C, 4D, and 4E are diagrams that show an example of a blur indicator display (the display of the blur indicator) performed in the step S307. Hereinafter, each of the drawings showing the example of the blur indicator display will be regarded as a display screen (a screen). In FIGS. 4A, 4B, and 4C, a dog as a main subject 402 overlapping a subject detection region 401 moves from the right to the left on the screen. FIG. 4A is a display example in the case that a panning speed of the digital camera 100 is faster than an appropriate panning speed that matches a moving speed of the main subject 402. The blur indicator includes a reference icon 403 and a blur icon 404. Based on a positional relationship between the reference icon 403 and the blur icon 404, a magnitude and a direction of a motion vector at a position on a straight line passing through the center of the main subject 402 is notified. The motion vector is a vector indicating which direction and how long the image has moved. For example, the motion vector can be detected by performing pattern matching between a certain image and an image one field before the certain image or two arbitrary images, among a plurality of continuously captured images. It should be noted that the method of detecting the motion vector is not limited to the above-described method, and existing methods may be used.

The system control unit 50 arranges the reference icon 403 at the center of a side in a direction different from a moving direction, depending on whether a moving direction component of the main subject 402 is horizontal or vertical with respect to a subject detection frame 405 of the main subject 402 or the like. Therefore, in FIG. 4A, since the main subject 402 moves in a horizontal direction from the right to the left on the screen, the reference icon 403 is arranged at the center of upper and lower sides of the subject detection frame 405. Furthermore, the system control unit 50 arranges the blur icon 404 on an axis of a side in the moving direction of the main subject 402 on which the reference icon 403 is arranged. At that time, the system control unit 50 arranges the blur icon 404 so that a distance between the reference icon 403 and the blur icon 404 becomes directly proportional to the magnitude of the motion vector by a predetermined proportionality factor.

Figure 4D:
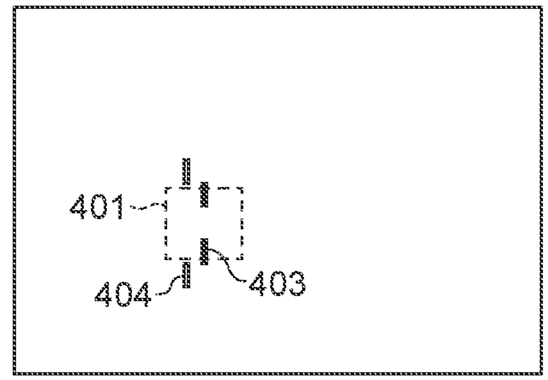
Figure 4E:
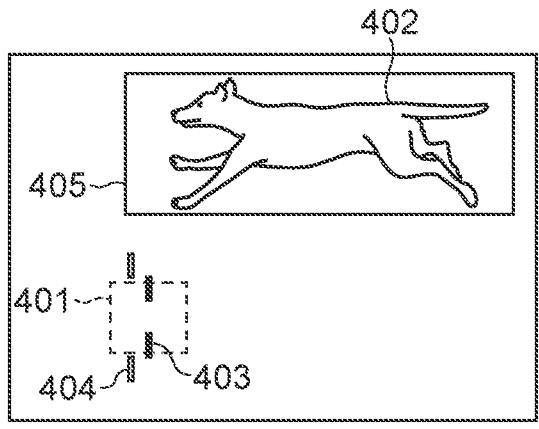

On the other hand, in the case that the panning speed of the digital camera 100 is the appropriate panning speed that matches the moving speed of the main subject 402, the reference icon 403 and the blur icon 404 are displayed as shown in FIG. 4B. Moreover, in the case that the panning speed of the digital camera 100 is lower than (slower than) the appropriate panning speed that matches the moving speed of the main subject 402, the reference icon 403 and the blur icon 404 are displayed as shown in FIG. 4C. Furthermore, in the case that the subject has not been detected within the subject detection region 401, as shown in FIG. 4D, the reference icon 403 and the blur icon 404 are displayed at positions corresponding to the subject detection region 401 at a predetermined interval. However, since the detection of the subject is performed in the entire LV image, even in the case that the subject has not been detected within the subject detection region 401, when the subject has been detected in the LV image, for example, the display shown in FIG. 4E is performed. In FIG. 4E, the subject detection frame 405 is displayed for the main object 402 outside the subject detection region 401, and the reference icon 403 and the blur icon 404 are displayed at positions corresponding to the subject detection region 401 at a predetermined interval.

It should be noted that an expression of the moving object blur amount based on the blur icon 404 may be expressed by a change in shape size or color of the blur icon 404 in addition to the positional relationship with the reference icon 403 as described above. Furthermore, in the following description, the main subject 402 may be referred to as a dog 402.

Figure 5A:
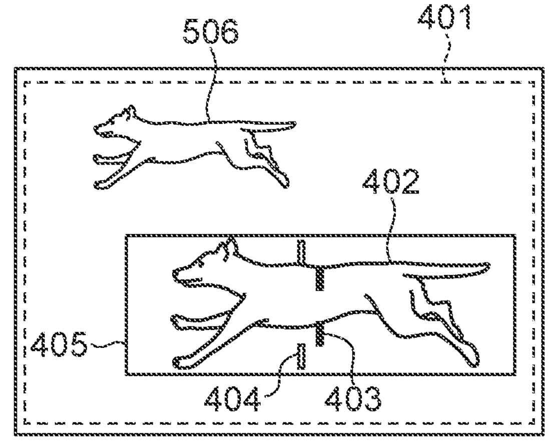
FIGS. 5A and 5B are diagrams for describing an example of the blur indicator display according to a first embodiment and a second embodiment.
Figure 5B:
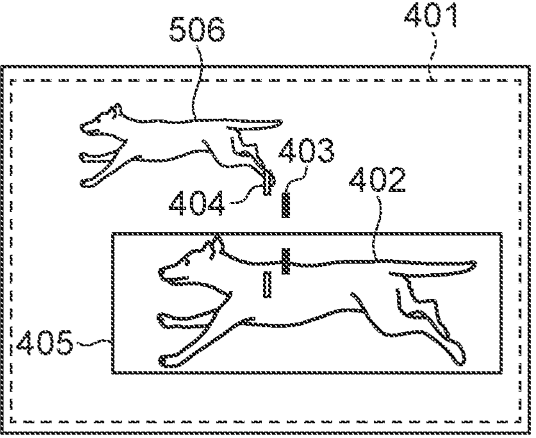

FIGS. 5A and 5B are diagrams for describing an example of the blur indicator display according to the first embodiment. As shown in FIG. 5A, it is assumed that two dogs have been detected as subjects within the subject detection region 401. In such case, although the user focuses on a dog 506, when the system control unit 50 determines the dog 402 belonging to the same subject type as the main subject, the subject detection frame 405 may be displayed for the dog 402. Furthermore, the display positions of the reference icon 403 and the blur icon 404 are changed in accordance with the subject detection frame 405. At that time, if the reference icon 403 and the blur icon 404 are switched to positions not intended by the user, it may interfere with composition creation such as panning by the user.

Such a phenomenon is likely to occur in the case that the size of the subject detection region 401 is a large size such as the entire screen. That is, such a phenomenon is likely to occur in a scene where a plurality of subjects have been detected within the subject detection region 401 and there are a plurality of candidates for the main subject. Therefore, the system control unit 50 determines a case where the size of the subject detection region 401 is equal to or larger than a threshold value as a case where transfer of the subject detection frame 405 unintended by the user is likely to occur. Furthermore, the system control unit 50, which has made such a determination, displays the reference icon 403 and the blur icon 404 at screen center positions as shown in FIG. 5B. In this way, the user is able to perform the composition creation such as panning without being affected by the determination in which the undesired subject is the main subject.

Figure 6:
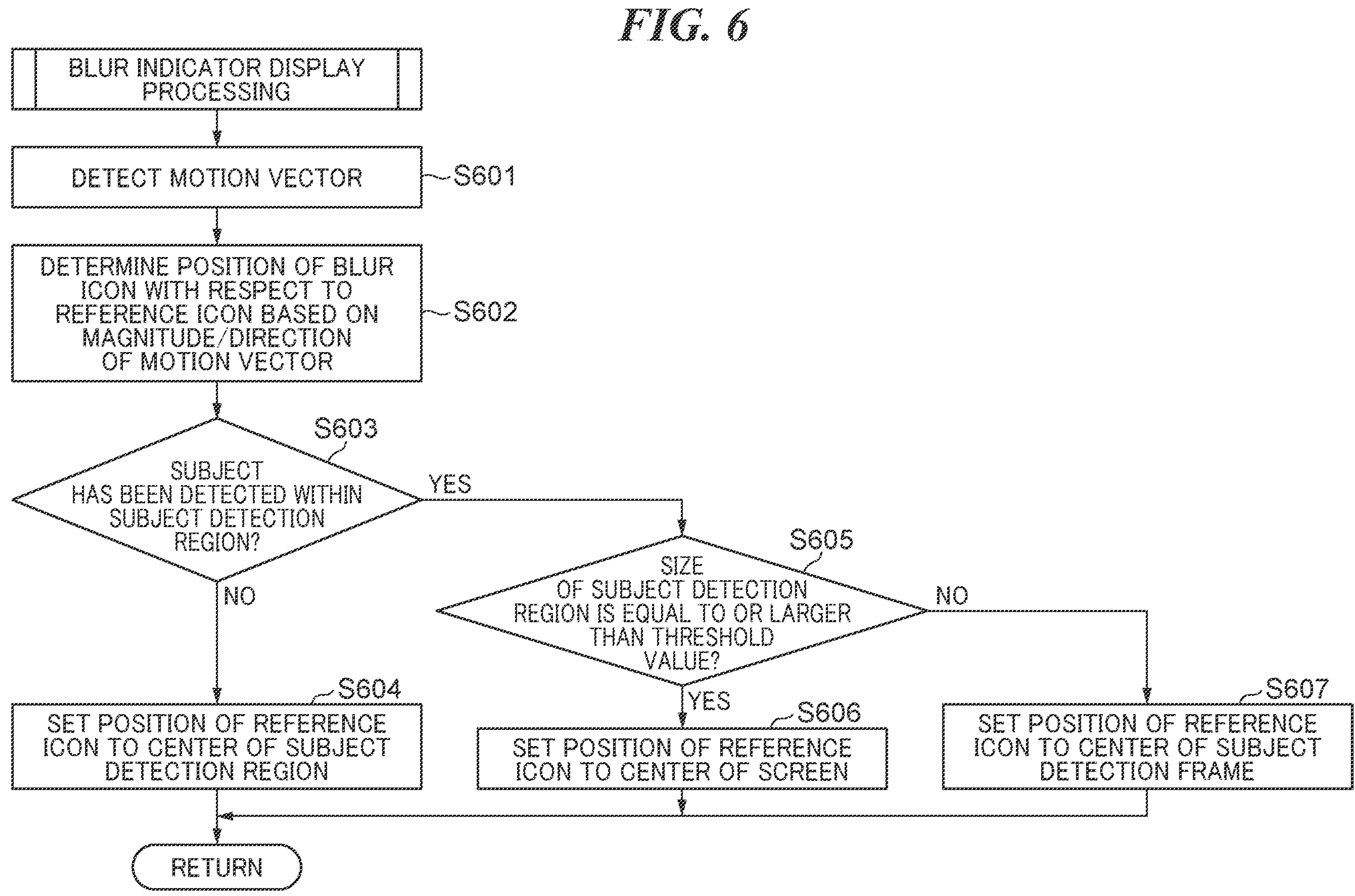
FIG. 6 is a flowchart that shows a blur indicator display processing performed in the step S307 according to the first embodiment.

FIG. 6 is a flowchart that shows a blur indicator display processing performed in the step S307 according to the first embodiment. In a step S601, the system control unit 50 detects a motion vector at a position on a straight line passing through the center of the main subject on which the subject detection frame 405 is displayed. In a step S602, the system control unit 50 determines the position of the blur icon 404 with respect to the reference icon 403 based on magnitude and direction components of the detected motion vector. Therefore, when the position of the reference icon 403 is changed as described below, the position of the blur icon 404 is also changed along with the change of the position of the reference icon 403. In a step S603, the system control unit 50 determines whether or not a subject has been detected within the subject detection region 401. In the case that the system control unit 50 determines that the subject has not been detected within the subject detection region 401, the processing proceeds to a step S604. On the other hand, in the case that the system control unit 50 determines that the subject has been detected within the subject detection region 401, the processing proceeds to a step S605. In the step S604, as shown in FIG. 4D, the system control unit 50 sets the position of the reference icon 403 to the center of the subject detection region 401. After that, the processing returns to the main flow shown in FIG. 3 and proceeds to the step S308.

In the step S605, the system control unit 50 determines whether or not the size of the subject detection region 401 is equal to or larger than a threshold value. In the case that the system control unit 50 determines that the size of the subject detection region 401 is equal to or larger than the threshold value, the processing proceeds to a step S606. On the other hand, in the case that the system control unit 50 determines that the size of the subject detection region 401 is smaller than the threshold value, the processing proceeds to a step S607. In the step S606, for example, as shown in FIG. 5B, the system control unit 50 sets the position of the reference icon 403 to the center of the screen on which the LV image is displayed (another position). After that, the processing returns to the main flow shown in FIG. 3 and proceeds to the step S308. In the step S607, for example, as shown in FIGS. 4A, 4B, and 4C, the system control unit 50 sets the position of the reference icon 403 to the center of the subject detection frame 405 (a display position). After that, the processing returns to the main flow shown in FIG. 3 and proceeds to the step S308.

As described above, in the case of determining that the transfer of the subject detection frame 405 unintended by the user is likely to occur, the digital camera 100 sets the position of the reference icon 403 of the blur indicator to the center of the screen. As a result, the digital camera 100 is capable of notifying the user of the presence of the possibility that the motion vector of the desired subject has not been detected (blur information of the subject has not been acquired). It should be noted that, even in such a case, when the subject detection frame 405 is displayed with respect to the subject intended by the user, even if the subject intended by the user is displayed in the vicinity of the screen edge, the position of the reference icon 403 of the blur indicator is set to the center of the screen. Therefore, the digital camera 100 is capable of displaying the indicator at a position with good visibility.

Hereinafter, a second embodiment will be described with reference to FIGS. 5A, 5B, and 7. Here, differences from the first embodiment will be mainly described.

FIGS. 5A and 5B are also diagrams for describing an example of the blur indicator display according to the second embodiment. As shown in FIG. 5A, it is assumed that two dogs have been detected as subjects within the subject detection region 401. In such case, although the user focuses on the dog 506, when the system control unit 50 determines the dog 402 belonging to the same subject type as the main subject, the subject detection frame 405 may be displayed for the dog 402. When such a display is performed, it means that the motion vector of the dog 506, which is the subject desired by the user, has not been detected. Such a phenomenon occurs when the transfer of the subject detection frame 405 unintended by the user occurs, and for example, such a phenomenon is likely to occur in the case that a first subject and a second subject are close to each other or overlap with each other. Therefore, the system control unit 50 determines a case where a distance between the center of the first subject and the center of the second subject (a distance between the centers) is shorter than half of the size of the first subject as the case that the first subject and the second subject are close to each other or overlap with each other. Furthermore, the system control unit 50, which has made such a determination, changes a color of the blur indicator. This also applies to a case where the distance between the center of the first subject and the center of the second subject (the distance between the centers) is shorter than half of the size of the second subject.

In the case of being determined that the first subject and the second subject are close to each other or overlap with each other, the color of the blur indicator is set to, for example, gray, and in other cases, the color of the blur indicator is set to a normal color, for example, white. In this way, in the case of being determined that the first subject and the second subject are close to each other or overlap with each other, it is effective to notify the user of the presence of the possibility that the motion vector of the subject desired by the user has not been detected by changing the color of the blur indicator.

FIG. 7 is a flowchart that shows a blur indicator display processing performed in the step S307 according to the second embodiment. Since steps S701 and S702 are similar to the steps S601 and S602 in FIG. 6, the descriptions thereof are omitted. In a step S703, the system control unit 50 determines whether or not a plurality of subjects have been detected within the subject detection region 401. In the case that the system control unit 50 determines that the plurality of subjects have not been detected within the subject detection region 401, the processing proceeds to a step S704. On the other hand, in the case that the system control unit 50 determines that the plurality of subjects have been detected within the subject detection region 401, the processing proceeds to a step S705. In the step S704, the system control unit 50 sets the display color of the blur indicator to white, which is the normal color. After that, the processing returns to the main flow shown in FIG. 3 and proceeds to the step S308.

In the step S705, the system control unit 50 determines whether or not the distance between the center of the first subject and the center of the second subject (the distance between the centers) is shorter than half of the size of the first subject (is shorter than a value obtained by multiplying the size of the first subject by a predetermined ratio). In the case that the system control unit 50 determines that the distance between the center of the first subject and the center of the second subject is not shorter than half of the size of the first subject, the processing proceeds to a step S706. On the other hand, in the case that the system control unit 50 determines that the distance between the center of the first subject and the center of the second subject is shorter than half of the size of the first subject (in the case that a predetermined condition is satisfied), the processing proceeds to a step S707. In the step S706, the system control unit 50 determines whether or not the distance between the center of the first subject and the center of the second subject (the distance between the centers) is shorter than half of the size of the second subject (is shorter than a value obtained by multiplying the size of the first subject by the predetermined ratio). In the case that the system control unit 50 determines that the distance between the center of the first subject and the center of the second subject is not shorter than half of the size of the second subject, the processing returns to the step S704. It should be noted that, in this case, as described above, the display color of the blur indicator is set to white, which is the normal color.

On the other hand, in the case that the system control unit 50 determines that the distance between the center of the first subject and the center of the second subject is shorter than half of the size of the second subject (in the case that the predetermined condition is satisfied), the processing proceeds to the step S707. In the step S707, the system control unit 50 sets the display color of the blur indicator to gray. After that, the processing returns to the main flow shown in FIG. 3 and proceeds to the step S308. It should be noted that, in the case that three or more subjects have been detected within the subject detection region 401, the determination in the step S705 and the determination in the step S706 are performed for all combinations in which two different subjects are extracted. As a result, in the case that the processing proceeds to the step S707 in accordance with any one of all the combinations, the display color of the blur indicator is set to gray, and in the case that the processing proceeds to the step S706 in accordance with all the combinations, the display color of the blur indicator is set to white, which is the normal color.

As described above, the digital camera 100 changes a display form of the blur indicator by changing the color for displaying the blur indicator (the display color of the blur indicator) from white to gray. As a result, in the case of determining that the first subject and the second subject are close to each other or overlap with each other, the digital camera 100 is capable of notifying the user of the presence of the possibility that the motion vector of the desired subject has not been detected (the blur information of the subject has not been acquired). It should be noted that the digital camera 100 may hide the blur indicator instead of changing the color for displaying the blur indicator from white to gray.

In addition, in the determination in the step S705, the distance between the center of the first subject and the center of the second subject is compared with half of the size of the first subject, i.e., the value obtained by multiplying the size of the first subject by 50% which is the predetermined ratio. Furthermore, in the determination in the step S706, the distance between the center of the first subject and the center of the second subject is compared with half of the size of the second subject, i.e., the value obtained by multiplying the size of the second subject by 50% which is the predetermined ratio. However, the predetermined ratio is not limited to 50%, and may be any ratio capable of determining the case that the first subject and the second subject are close to each other or overlap with each other.

Hereinafter, a third embodiment will be described with reference to FIGS. 8A, 8B, 8C, 8D, and 9. Here, differences from the first embodiment will be mainly described.

Figure 8A:
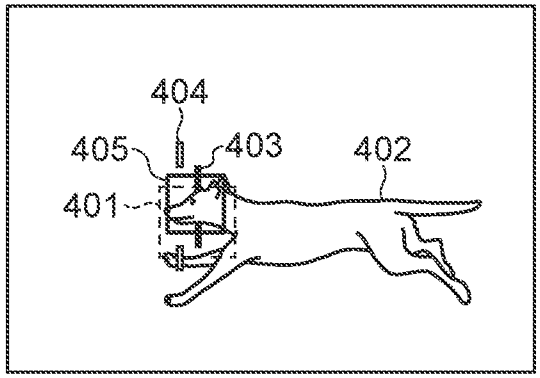
FIGS. 8A, 8B, 8C, and 8D are diagrams for describing an example of the blur indicator display according to a third embodiment.
Figure 8B:
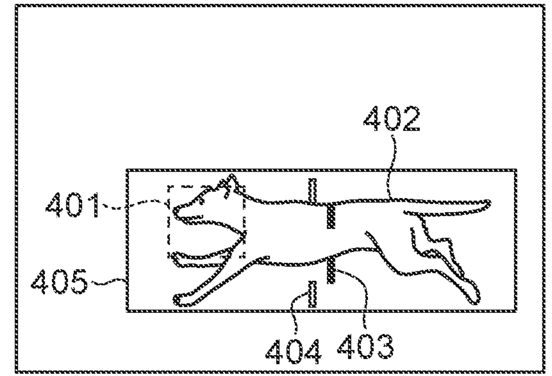

FIGS. 8A, 8B, 8C, and 8D are diagrams for describing an example of the blur indicator display according to the third embodiment. When detecting the dog 402 that is the main subject, the system control unit 50 is capable of simultaneously detecting a local portion such as a pupil or a head and an entire portion including the head, a torso, etc. It is assumed that when both the local portion and the entire portion have been detected, as shown in FIG. 8A, the subject detection frame 405 is displayed at the local portion, and when the local portion is lost, as shown in FIG. 8B, the subject detection frame 405 is displayed at the entire portion. In this regard, since the local portion is smaller in size than the entire portion, the local portion is easily lost. Therefore, the detection of the local portion and the loss of the local portion may be repeated. Therefore, in such case, when the reference icon 403 and the blur icon 404 are displayed in response to the subject detection frame 405, the reference icon 403 and the blur icon 404 move back and forth between the local portion and the entire portion, which interferes with the composition creation such as the panning by the user.

Figure 8C:
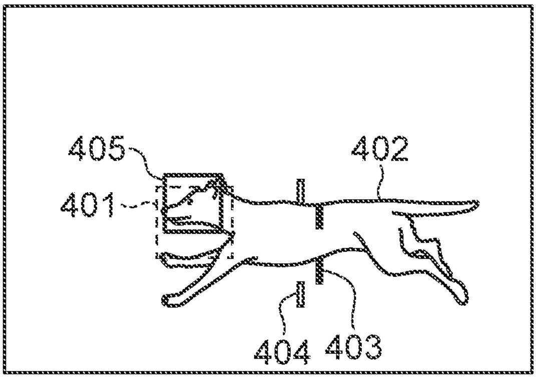
Figure 8D:
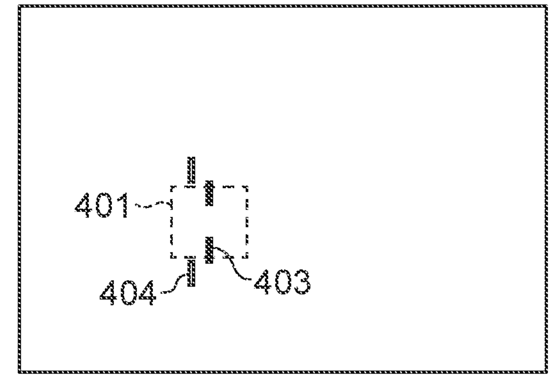

Accordingly, in the case that both the local portion and the entire portion of the main subject have been detected, the system control unit 50 performs a display shown in FIG. 8C. That is, the system control unit 50 displays the subject detection frame 405 at the local portion of the main subject, and also displays the reference icon 403 and the blur icon 404 at positions corresponding to the entire portion of the main subject. It should be noted that, when automatic focusing is performed, considering that it is desirable to perform the automatic focusing on the local portion of the main subject, the subject detection frame 405 is displayed at the local portion of the main subject so that an automatic focusing position can be known. Furthermore, in the case that only the entire portion of the main subject has been detected, as shown in FIG. 8B, the system control unit 50 displays the subject detection frame 405 at the entire portion of the main subject, and also displays the reference icon 403 and the blur icon 404 at the positions corresponding to the entire portion of the main subject. Furthermore, in the case that no subject has been detected, as shown in FIG. 8D, the system control unit 50 displays the reference icon 403 and the blur icon 404 at positions corresponding to the subject detection region 401. In this way, the user is able to perform the composition creation such as the panning without being affected by the detection of the local portion and the loss of the local portion being repeated.

FIG. 9 is a flowchart that shows a blur indicator display processing performed in the step S307 according to the third embodiment. Since steps S901 to S904 are similar to the steps S601 to S604 in FIG. 6, the descriptions thereof are omitted. In a step S905, the system control unit 50 determines whether or not both the entire portion and the local portion of the main subject have been detected. In the case that the system control unit 50 determines that both the entire portion and the local portion of the main subject have been detected, the processing proceeds to a step S906. On the other hand, in the case that the system control unit 50 determines that both the entire portion and the local portion of the main subject have not been detected, the processing proceeds to a step S907.

In the step S906, as shown in FIG. 8C, the system control unit 50 sets the position of the reference icon 403 to the center of the entire portion of the main subject. At this time, the system control unit 50 displays the subject detection frame 405 with respect to the local portion of the main subject. After that, the processing returns to the main flow shown in FIG. 3 and proceeds to the step S308. In the step S907, the system control unit 50 arranges the position of the reference icon 403 at the center of the detected portion of the main subject. It should be noted that the subject detection frame 405 is displayed with respect to the detected portion of the main subject. For example, in the case that the entire portion of the main subject has been detected, as shown in FIG. 8B, the system control unit 50 displays the subject detection frame 405 with respect to the entire portion of the main subject, and also sets the position of the reference icon 403 to the center of the entire portion of the main subject. After that, the processing returns to the main flow shown in FIG. 3 and proceeds to the step S308.

As described above, in the case that both the entire portion and the local portion of the main subject have been detected, the digital camera 100 sets the center of the entire portion of the main subject, not the center of the local portion of the main subject, to the position of the reference icon 403 of the blur indicator. As a result, the digital camera 100 is capable of displaying the indicator at the position with good visibility. Furthermore, in the case that both the entire portion and the local portion of the main subject have been detected, the digital camera 100 displays the subject detection frame 405 with respect to the local portion of the main subject instead of the entire portion of the main subject on which the blur indicator is displayed. As a result, the digital camera 100 is capable of notifying the user of the presence of the possibility that the motion vector of the desired subject has not been detected (the blur information of the subject has not been acquired). It should be noted that, contrary to the above description, even in the case that the blur indicator is displayed on the local portion of the main subject and the subject detection frame 405 is displayed with respect to the entire portion of the main subject, it is possible to notify the user of the presence of the possibility that the motion vector of the desired subject has not been detected (the blur information of the subject has not been acquired).

Hereinafter, a fourth embodiment will be described with reference to FIGS. 10A, 10B, 10C, and 11. Here, differences from the first embodiment will be mainly described.

Figure 10A:
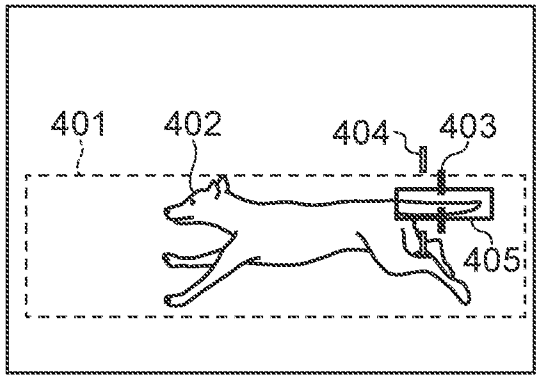
FIGS. 10A, 10B, and 10C are diagrams for describing an example of the blur indicator display according to a fourth embodiment and a fifth embodiment.
Figure 10B:
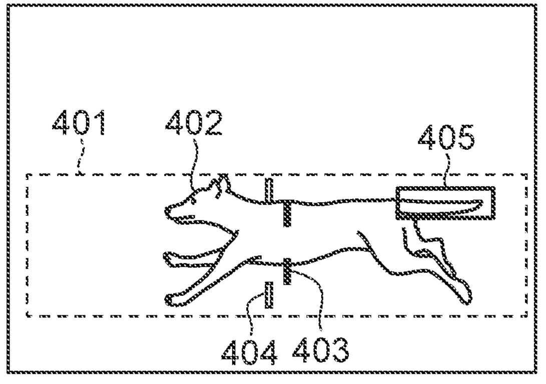

FIGS. 10A and 10B are diagrams for describing an example of the blur indicator display according to the fourth embodiment. In order to improve subject detection accuracy, the digital camera 100 performs machine learning in advance with respect to a large amount of image data by using a subject type (the type of the subject), such as a dog, as correct answer data. In the case that there is no subject belonging to a machine-learned subject type (a subject type that has been machine-learned) within the subject detection region 401, the system control unit 50 displays the subject detection frame 405 on the display unit 28 with respect to an object that has a high feature amount and locates within the subject detection region 401. At this time, since the subject detection accuracy is not high, the subject detection frame 405 may not be displayed at a position desired by the user. For example, in the case that a subject type being dog has not been machine-learned, as shown in FIG. 10A, the subject detection frame 405 may be displayed with respect to a tail portion of the dog 402. Furthermore, the display positions of the reference icon 403 and the blur icon 404 are changed in accordance with the subject detection frame 405. At that time, when both the reference icon 403 and the blur icon 404 are displayed at positions corresponding to the tail portion of the dog 402, in the case that the user focuses on the entire portion of the dog 402, it interferes with the composition creation such as the panning by the user.

Therefore, in the case that the system control unit 50 has detected a subject belonging to a subject type that has not been machine-learned, as shown in FIG. 10B, the system control unit displays the reference icon 403 and the blur icon 404 in the subject detection region 401. In this regard, the user is able to change the position and the size of the subject detection region 401 by an operation using the GUI according to the composition desired to be shot. Therefore, the reference icon 403 and the blur icon 404 can be displayed at a position close to the position desired by the user. In this way, even in the case that the detected main subject is the subject belonging to the subject type that has not been machine-learned, the user is able to perform the composition creation such as the panning while viewing the blur indicator at the position close to the position desired by the user. It should be noted that the machine learning includes, for example, deep learning.

Figure 11:
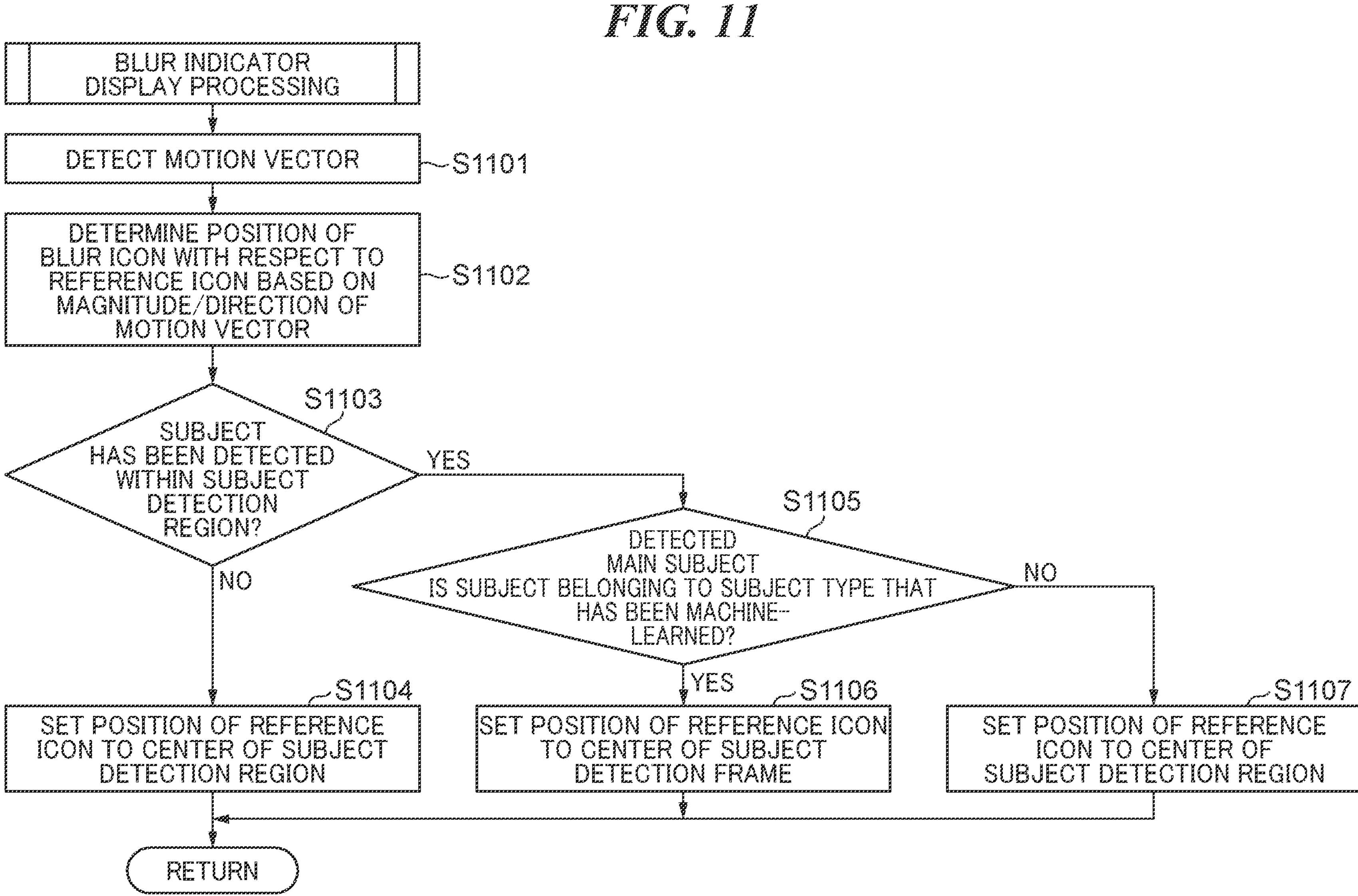
FIG. 11 is a flowchart that shows a blur indicator display processing performed in the step S307 according to the fourth embodiment.

FIG. 11 is a flowchart that shows a blur indicator display processing performed in the step S307 according to the fourth embodiment. Since steps S1101 to S1104 are similar to the steps S601 to S604 in FIG. 6, the descriptions thereof are omitted. In a step S1105, the system control unit 50 determines whether or not the detected main subject is a subject belonging to the machine-learned subject type. In the case that the system control unit 50 determines that the detected main subject is the subject belonging to the machine-learned subject type, the processing proceeds to a step S1106. On the other hand, in the case that the system control unit 50 determines that the detected main subject is not the subject belonging to the machine-learned subject type, that is, in the case that the system control unit 50 determines that the detected main subject is not subject to the machine learning, the processing proceeds to a step S1107.

In the step S1106, as shown in FIG. 10A, the system control unit 50 sets the position of the reference icon 403 to the center of the subject detection frame 405 (the display position). After that, the processing returns to the main flow shown in FIG. 3 and proceeds to the step S308. In the step S1107, as shown in FIG. 10B, the system control unit 50 sets the position of the reference icon 403 to the center of the subject detection region 401 (another position). After that, the processing returns to the main flow shown in FIG. 3 and proceeds to the step S308.

As described above, in the case of determining that the detected main subject is not the subject belonging to the machine-learned subject type, the digital camera 100 sets the center of the subject detection region 401 whose position and size can be changed by the user operation to the position of the reference icon 403 of the blur indicator. As a result, the digital camera 100 is capable of displaying the indicator at a position with good visibility that is desired by the user. Furthermore, in the case of determining that the detected main subject is not the subject belonging to the machine-learned subject type, the digital camera 100 sets the center of the subject detection region 401 instead of the center of the subject detection frame 405 to the position of the reference icon 403 of the blur indicator. As a result, the digital camera 100 is capable of notifying the user of the presence of the possibility that the motion vector of the desired subject has not been detected (the blur information of the subject has not been acquired).

Hereinafter, a fifth embodiment will be described with reference to FIGS. 10A, 10B, 10C, and 12. Here, differences from the fourth embodiment will be mainly described.

Figure 10C:
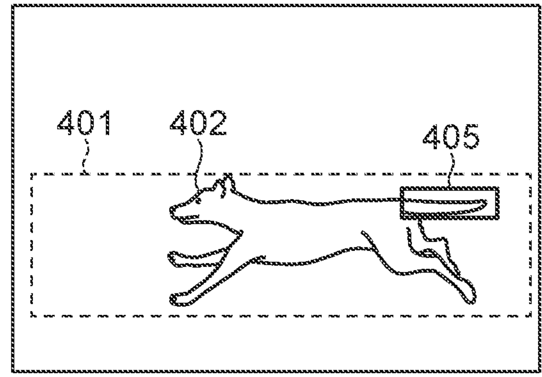

FIGS. 10A, 10B, and 10C are also diagrams for describing an example of the blur indicator display according to the fifth embodiment. In the case that the detected main subject is the subject belonging to the subject type that has not been machine-learned, since the subject detection accuracy is not high, there may be a case where the motion vector of the subject desired by the user has not been detected. Therefore, in the case that the system control unit 50 has detected the subject belonging to the subject type that has not been machine-learned, as shown in FIG. 10C, the system control unit 50 hides the reference icon 403 and the blur icon 404. In this way, by the reference icon 403 and the blur icon 404 being hidden, the user is able to know the presence of the possibility that the motion vector of the subject desired by the user has not been detected.

Figure 12:
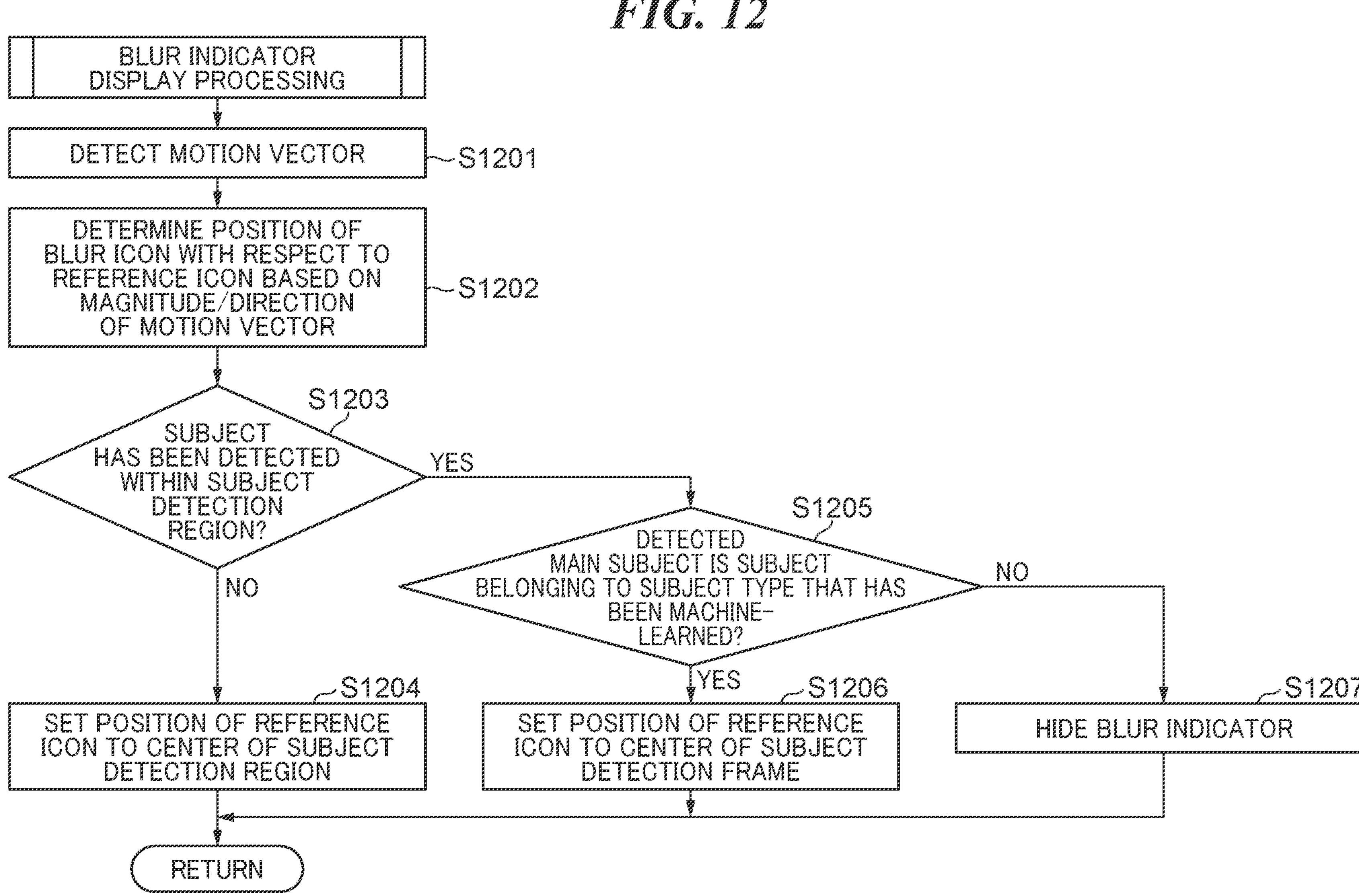
FIG. 12 is a flowchart that shows a blur indicator display processing performed in the step S307 according to the fifth embodiment.

FIG. 12 is a flowchart that shows a blur indicator display processing performed in the step S307 according to the fifth embodiment. Since steps S1201 to S1206 are similar to the steps S1101 to S1106 in FIG. 11, the descriptions thereof are omitted. In a step S1207, the system control unit 50 hides the blur indicator. That is, in the case that the detected main subject is not the subject belonging to the machine-learned subject type (in the case that the predetermined condition is satisfied), the reference icon 403 and the blur icon 404 are hidden. After that, the processing returns to the main flow shown in FIG. 3 and proceeds to the step S308. As described above, in the case of determining that the detected main subject is not the subject belonging to the machine-learned subject type, that is, in the case of determining that the detected main subject is not subject to the machine learning, the digital camera 100 changes the display form of the blur indicator by hiding the blur indicator. As a result, the digital camera 100 is capable of notifying the user of the presence of the possibility that the motion vector of the desired subject has not been detected (the blur information of the subject has not been acquired). It should be noted that the digital camera 100 may change the color for displaying the blur indicator instead of hiding the blur indicator.

Although the preferred embodiments of the present disclosure have been described above, the present disclosure is not limited to the above-described embodiments, and various modifications and changes can be made within the scope of the gist of the present disclosure.

For example, the above-described various types of control described as being performed by the system control unit 50 may be performed by one piece of hardware, or the entire apparatus may be controlled by a plurality of pieces of hardware sharing processing.

Furthermore, in each of the above-described embodiments, the case where the present disclosure is applied to the digital camera 100 has been described as an example, but the present disclosure is not limited to this example, and the present disclosure can be applied to any image pickup apparatus capable of panning. That is, the present disclosure is applicable to a personal computer, a personal digital assistant (PDA), a mobile phone terminal, a portable image viewer, and the like having an image pickup function. The present disclosure is also applicable to a digital photo frame, a music player, a game machine, an electronic book reader, a tablet terminal, a smartphone, and the like having the image pickup function.

Furthermore, the image pickup apparatus is an example of an image processing apparatus to which the present disclosure can be applied. Examples of the image processing apparatus to which the present disclosure can be applied include computer equipment (a personal computer, a tablet computer, a media player, a PDA, etc.), a mobile phone, a smartphone, a game machine, a robot, a drone, and a drive recorder.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-200566, filed on Dec. 15, 2022, which is hereby incorporated by reference herein in its entirety.

What is claimed is:

1. An image processing apparatus comprising:

one or more processors; and a memory storing instructions which, when executed by the one or more processors, cause the image processing apparatus to function as:

a detection unit that detects a subject from a live view image; and a display control unit that displays an indicator indicating blur information on the subject detected by the detection unit so as to be superimposed on the live view image, and wherein the display control unit controls a display of the indicator in the live view image based on first information related to a detection region in which the detection unit detects the subject and/or second information related to the subject detected by the detection unit, wherein the display control unit displays the indicator at a display position of the subject detected by the detection unit or at another position different from the display position, wherein in a case that a size of the detection region in which the detection unit detects the subject is equal to or larger than a threshold value, the display control unit displays the indicator at the another position, and wherein the another position is a center of a screen on which the live view image is displayed.

2. The image processing apparatus according to claim 1, wherein the first information is information on a size of the detection region in which the detection unit detects the subject.

3. The image processing apparatus according to claim 1, wherein the second information is information including at least one of a number, a size, a position, a portion, and a type of the subject detected by the detection unit.

4. The image processing apparatus according to claim 1, wherein in a case that a type of the subject detected by the detection unit is not subject to machine learning, the display control unit displays the indicator at the another position.

5. The image processing apparatus according to claim 4, wherein the instructions, when executed by the one or more processors, cause the image processing apparatus to function as an update unit that updates a position or a size of the detection region in which the detection unit detects the subject, and the another position is a center of the detection region in which the detection unit detects the subject.

6. The image processing apparatus according to claim 5, wherein the display control unit displays a subject detection frame on the subject detected by the detection unit.

7. The image processing apparatus according to claim 1, wherein in a case that the detection unit has detected an entire portion and a local portion of the subject, the display control unit displays the indicator on the entire portion of the subject detected by the detection unit.

8. The image processing apparatus according to claim 1, wherein in a case that the detection unit has detected an entire portion and a local portion of the subject, the display control unit displays the indicator on one of the entire portion and the local portion of the subject detected by the detection unit, and displays a subject detection frame on the other.

9. The image processing apparatus according to claim 1, wherein in a case that a predetermined condition is satisfied, the display control unit changes a display form of the indicator.

10. The image processing apparatus according to claim 9, wherein in a case that a distance between centers of a first subject and a second subject detected by the detection unit is shorter than a value obtained by multiplying a size of the first subject or a size of the second subject by a predetermined ratio, the predetermined condition is satisfied.

11. The image processing apparatus according to claim 9, wherein in a case that a type of the subject detected by the detection unit is not subject to machine learning, the predetermined condition is satisfied.

12. The image processing apparatus according to claim 9, wherein the display control unit changes a color for displaying the indicator as a change in a display form of the indicator.

13. The image processing apparatus according to claim 9, wherein the display control unit hides the indicator as a change in a display form of the indicator.

14. An image pickup apparatus comprising:

the image processing apparatus according to claim 1; and an image pickup device that obtains a live view image.

15. A control method for an image processing apparatus comprising:

detecting a subject from a live view image; and performing display control that displays an indicator indicating blur information of the detected subject so as to be superimposed on the live view image, wherein the display control includes controlling a display of the indicator in the live view image based on first information related to a detection region in which the subject is detected and/or second information related to the detected subject, wherein the display control includes displaying the indicator at a display position of the detected subject or at another position different from the display position, wherein the display control includes, in a case that a size of the detection region in which the subject is detected is equal to or larger than a threshold value, displaying the indicator at the another position, and wherein the another position is a center of a screen on which the live view image is displayed.

16. A non-transitory computer-readable storage medium storing a program for causing a computer to execute a control method for an image processing apparatus, the control method comprising:

detecting a subject from a live view image; and performing display control that displays an indicator indicating blur information of the detected subject so as to be superimposed on the live view image, wherein the display control includes controlling a display of the indicator in the live view image based on first information related to a detection region in which the subject is detected and/or second information related to the detected subject, wherein the display control includes displaying the indicator at a display position of the detected subject or at another position different from the display position, wherein the display control includes, in a case that a size of the detection region in which the subject is detected is equal to or larger than a threshold value, displaying the indicator at the another position, and wherein the another position is a center of a screen on which the live view image is displayed.

* * * * *